(12) United States Patent
Sakurabayashi et al.

(10) Patent No.: US 7,291,318 B2
(45) Date of Patent: Nov. 6, 2007

(54) METHODS FOR MANUFACTURING MULTI-WALL CARBON NANOTUBES

(75) Inventors: Yasunori Sakurabayashi, Toyota (JP); Takuya Kondo, Toyota (JP); Yasushi Yamazawa, Aichi-ken (JP); Yoshinao Suzuki, Toyota (JP); Marc Monthioux, Aussonne (FR); Mikako LE. Lay, Brussels (BE)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 428 days.

(21) Appl. No.: 10/687,805

(22) Filed: Oct. 20, 2003

(65) Prior Publication Data

US 2004/0086448 A1 May 6, 2004

(30) Foreign Application Priority Data

Oct. 22, 2002 (JP) ............................ 2002-307351

(51) Int. Cl.
*D01F 9/12* (2006.01)
*B82B 3/00* (2006.01)
(52) U.S. Cl. ............... 423/447.1; 977/844; 204/157.47
(58) Field of Classification Search ........... 204/157.47; 977/744, 752, 844; 423/447.1
See application file for complete search history.

(56) References Cited

U.S. PATENT DOCUMENTS

| | | | |
|---|---|---|---|
| 6,495,116 B1 | 12/2002 | Herman | |
| 6,544,463 B1 * | 4/2003 | Luzzi et al. | 264/346 |
| 2004/0241079 A1 * | 12/2004 | Takenobu et al. | 423/447.2 |

FOREIGN PATENT DOCUMENTS

| | | |
|---|---|---|
| JP | 2002-80211 | 3/2002 |
| JP | 2002-97009 | 4/2002 |
| JP | 2002-97010 | 4/2002 |

OTHER PUBLICATIONS

Bandow, S., "Double-wall Carbon Nanotubes Derived from Fullerene Arrays Generated inside Single-wall Carbon Nanotubes: Nanometer Scale Test Tube" May 2005, Function & Materials vol. 21, No. 5, pp. 85-91.*
Chemical Physics Letter 321, Formation Mechanism of Fullerene Peapods and Coaxial Tubes: A Path to Large Scale Synthesis, Smith et al., Apr. 21, 2000, pp. 169-174.
Carbon 38, "Carbon Cage Structures in Single Wall Carbon Nanotubes: A New Class of Materials" Luzzi et al., 2000, pp. 1751-1756.
Function & Materials, "Double-wall Carbon Nanotubes derived from Fullerene Arrays Generated Inside Single-wall Carbon Nanotubes: Nanometer Scale Test Tube", vol. 21, No. 5, pp. 85-91 (May 2001) with its English abstract.
Chemical Physics Letters 315, Carbon Nanotube Encapsulated Fullerenes: A Unique Class of Hybrid Materials, Smith et al., Dec. 17, 1999, pp. 31-36.
Physica B323, "Carbon Nanotubes: Past, Present, and Future", Iijima, 2002, pp. 1-5.
Koshio, Akira, et al., "Metal-free production of high-quality multi-wall carbon nanotubes, in which the innermost nanotubes have a diameter of 0.4 nm," *Chem. Phys. Letters*, 356 (2002), pp. 595-600.
Monthioux, M., Filling single-wall carbon nanotubes, *Carbon* 40 (2002, pp. 1809-1823.
Luzzi, David E., et al., "Nanoscopic hybrid materials: The synthesis, structure and properties of peapods, cats and kin" *Sci. and Appln. of Nanotubes, Proceedings of Nanotube '99*, An International Conference, Jul. 24-27, 1999 (2000).
Ci, L., et al., "Double wall carbon nanotubes promoted by sulfur in a floating iron catalyst CVD system," *Chemical Physical Letters* 359, Jun. 13, 2002, pp. 63-67.
David E. Luzzi et al., "Carbon cage structures in single wall carbon nanotubes: a new class of materials," *Carbon*, 2000 vol. 38, Nos. 11-12, pp. 1751-1756.
M. Monthioux, et al., "Sensitivity of single-wall carbon nanotubes to chemical processing: an electron microscopy investigation," *Carbon*, 2001, vol. 39, No. 8, pp. 1251-1272.

* cited by examiner

*Primary Examiner*—Stuart Hendrickson
(74) *Attorney, Agent, or Firm*—Finnegan, Henderson, Farabow, Garrett & Dunner, L.L.P.

(57) ABSTRACT

A method is presented for effectively manufacturing multi-wall (double-wall, etc.) carbon nanotubes (CNTs) having a structure whereby interior tubes are formed within the CNTs. In this manufacturing method, fullerene/CNT hybrid structures are prepared, wherein assembled fullerenes, these being fullerenes that are linked, have been housed within single-wall CNTs. The interior tubes are formed from the assembled fullerenes by subjecting the hybrid structures to electron beam irradiation while in a heated state. It is preferred that irradiation with the electron beams occurs at a temperature of 100~500° C. and with the electron beams having an accelerating voltage of 80~250 kV. According to the manufacturing method of the present invention, multi-wall CNTs with few defects can be manufactured at lower temperatures and in a shorter period than in the case where the fullerene/CNT hybrid structures are only maintained under high temperature conditions (and electron beam irradiation is not performed).

15 Claims, 6 Drawing Sheets

(a)

1.5nm (b)

(a)

1.5nm (b)

(a)

1.5nm (b)

(a)

1.5nm (b)

(a)

1.5nm (b)

(a)

1.5nm (b)

METHODS FOR MANUFACTURING MULTI-WALL CARBON NANOTUBES

This application claims priority to Japanese Patent Application No. 2002-307351, filed Oct. 22, 2002, the contents of which are incorporated herein by reference.

BACKGROUND OF THE INVENTION

1. Field of the Invention

The present invention relates to carbon nanotubes, specifically to methods for manufacturing multi-wall carbon nanotubes having tubular structures consisting mainly of carbon located within carbon nanotubes.

2. Description of the Related Art

Single-wall and multi-wall carbon nanotubes (CNT) are known to the art, and it is expected that they will become a useful material in various fields. Further, CNTs have also been studied wherein the interior (within the tube) of the CNT has been filled with various materials. For example, Japanese Unexamined Patent Application Publications Nos. 2002-97009 and 2002-97010 disclose hybrid single-wall CNTs having a structure (also termed peapod structure) whereby $C_{60}$ etc. fullerenes are linked in a chain shape within the tube of single-wall CNTs.

A technique known to the art is to maintain single-wall CNTs having a peapod structure (hereafter referred to simply as peapods) for about 24 hours at 1100° C. or above, the $C_{60}$ molecules contained therein fusing, and nested tubes being formed (Brian W. Smith, David E. Luzzi, Chemical Physics Letters 321 (2000) 169-174).

However, in this type of method of treating peapods over long periods, at temperatures over 1000° C. and for 12 hours or more, low numbers of nested tubes are produced. Further, in this method, virtually the same degree of thermal energy is applied to the entirety of the peapods. As a result, processing to cause fusion of the $C_{60}$ cannot be performed on only a portion of the peapods (that is, selecting the locations).

Moreover, it has been reported that irradiating the peapods with electron beams having an accelerating energy of up to 100 keV for 15 minutes causes fusion of the $C_{60}$ molecules therein, forming capsules (David E. Luzzi, Brian W. Smith, Carbon 38 (2000) 1751-1756).

However, the fusion of the $C_{60}$ does not progress adequately in the capsules formed by electron beam irradiation. As a result, defects (structural disturbance, etc.) are relatively common. It might be considered that extending the electron beam irradiation time could cause the fusion of the $C_{60}$ to progress further. However, as the above report has noted, damage (structural damage) to the CNTs forming the exterior tube of the peapods is observed when, under conventional conditions, the irradiation with electron beams having an accelerating energy of 100 keV is continued (for 5 minutes or longer, for example). The damage to the exterior tubes tends to increase as the length of electron beam irradiation time increases. Further, manufacturing efficiency and energy efficiency fall as the irradiation time is extended, and manufacturing costs consequently increase.

SUMMARY OF THE INVENTION

One aim of the present invention is to present a method for manufacturing multi CNTs whereby multi-wall (typically, double-wall) nanotubes having few defects are manufactured efficiently. Another aim of the present invention is to present a method for manufacturing multi-wall CNTs whereby the location can be selected where the interior tubes will be formed from assembled fullerenes within the CNTs. A further, related, aim is to present multi-wall CNTs containing specified (in particular, small diameter) interior tubes, and a manufacturing method therefor. Another further, related, aim is to present multi-wall CNTs wherein a plurality of interior tubes are housed in series within the exterior tubes. Furthermore, an aim is to present a manufacturing method wherein the average length of the interior tubes forming part of the multi-wall CNTs can be controlled.

In the process to form interior tubes from assembled fullerenes housed within CNTs, the present inventors have discovered that the above problem can be solved by combining thermal energy and the energy of electron beam irradiation.

The manufacturing method for multi-wall (typically, double-wall) CNTs disclosed herein includes: a process for preparing fullerene/carbon nanotube hybrid structures (also referred to below as 'CNT hybrid structures') wherein assembled fullerenes, consisting of linked fullerenes, are housed within CNTs (exterior tubes); and a process whereby electron beam irradiation is performed on CNT hybrid structures while these CNT hybrid structures are in a heated state, this process forming interior tubes from the assembled fullerenes.

In this manufacturing method, in the process of forming the interior tubes from the assembled fullerenes, energy is supplied to the CNT hybrid structures as both thermal energy and electron beams. By this means, compared to the case where essentially only thermal energy is supplied (for example, compared to conventional high temperature treatment conditions whereby CNT hybrid structures are maintained at 1000° C. or above for 12 hours or more), the interior tubes can be formed from the assembled fullerenes using lower temperatures and a shorter treatment period. Further, the CNT hybrid structures are irradiated with the electron beams while in a heated state. Consequently, recovery from the damage caused by the electron beams is accelerated compared to the case where the CNT hybrid structures are irradiated with the electron beams while at room temperature (typically, 20~25° C.). As a result, multi-wall CNTs with few defects can be manufactured efficiently.

The extent of defects of the multi-wall CNTs (exterior tubes and/or interior tubes) can be observed using, for example, a transmission electron microscope with magnification 500,000. Furthermore, the presence or absence of interior tube formation, and the extent thereof, can also be observed using the transmission electron microscope with magnification 500,000, or the like. Under the same observation conditions, the wall's faces of the multi-wall CNTs with few defects can be observed to be line-shaped and with few irregularities.

The CNTs forming the exterior walls (exterior tubes) of the CNT hybrid structures are usually essentially single-wall CNTs. Further, the interior walls formed from the assembled fullerenes are typically formed chiefly from single-wall graphite. Typically, at least a part of the multi-wall CNTs manufactured in accordance with the method disclosed herein are multi-wall CNTs having a structure whereby single-wall graphite form the exterior tubes and single-wall graphite form the interior tubes, thereby forming multiple adjoining wall faces (multi-walls). Although no particular restrictions are present, an average space in a circumferential direction between the wall faces comprising the multi-wall structure (the space between inner surface faces of the exterior tubes and outer surface faces of the interior tubes) can be, for example, approximately 0.05~1 nm, and is preferably approximately 0.2~0.6 nm. Alternatively, the wall faces of the exterior tubes and interior tubes may be laminated such that there is essentially no space therebetween.

It is preferred that the process for forming the interior walls from the assembled fullerenes fulfills at least one of the following conditions:
(1). Irradiation with electron beams is performed at a temperature of 100~500° C.;
(2). Irradiation with electron beams is performed at an accelerating voltage of 80~250 kV.

By performing the process under these conditions, multi-wall CNTs with few defects can be manufactured efficiently. Performing the process while fulfilling both conditions (1) and (2) allows even better results to be obtained.

In the process for forming interior walls from assembled fullerenes, the period of irradiation with electron beams can be 15 minutes or less. In the manufacturing method disclosed herein, the assembled fullerenes are irradiated by the electron beams within a prescribed temperature range. Consequently, multi-wall CNTs with few defects can be obtained even in the case where the interior walls are formed (the formation of multi-walls is caused to progress) by performing irradiation for a short period in this manner.

The CNT hybrid structures used in this manufacturing method are preferably those wherein assembled fullerenes composed chiefly of $C_{60}$ can be prepared within CNT tubes (typically single-wall CNTs). Manufacture and availability of this type of CNT hybrid structure is straightforward. Furthermore, since the shape of the fullerenes that constitute the assembled fullerenes exhibits a high degree of symmetry, interior tubes having a high degree of uniformity in shape (in diameter, etc.) can easily be formed from these assembled fullerenes.

DETAILED DESCRIPTION OF THE INVENTION

Figure 1:
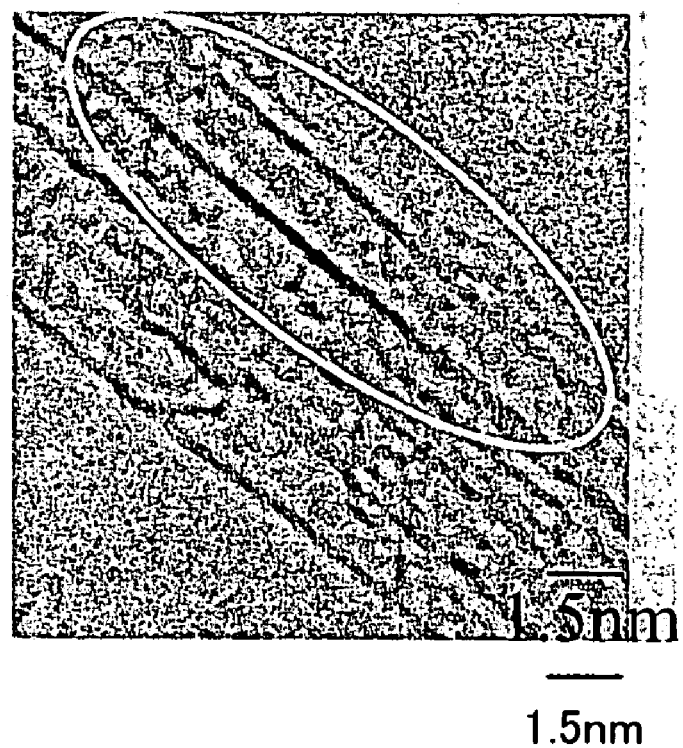
FIG. 1(a) is a TEM photograph of a CNT hybrid structure manufactured by the method of Test 1 (magnification; 500,000)
FIG. 1(b) is a view describing the structure shown in the TEM photograph.
Figure 1:
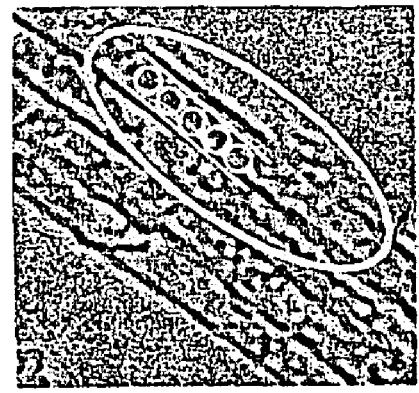

A preferred embodiment of the present invention is described below. Moreover, items other than items specifically mentioned in the present specification and necessary to the embodiment of the present invention can be grasped as established items based on prior art by a person skilled in the art. The present invention can be embodied on the basis of the items disclosed in the present specification as well as technical knowledge common in the present field.

CNT hybrid structures utilized in a manufacturing method disclosed herein are formed from CNTs (typically single-wall CNTS) and a plurality of fullerenes housed (filled) within the tubes of the CNTs. The plurality of fullerenes are linked in a chain shape within the CNT tubes to form assembled fullerenes. Here, 'linked' means that the plurality of fullerenes are aligned in an adjacent manner, and is not restricted to cases where the fullerenes make physical contact.

Assembled fullerenes for forming peapod structures are typically formed essentially from $C_{60}$. In the manufacturing method disclosed herein as well, CNT hybrid structures having assembled fullerenes formed essentially from $C_{60}$ can preferably be utilized. However, assembled fullerenes containing fullerenes other than $C_{60}$ (for example, $C_{70}$, $C_{82}$, etc.) may also be utilized. The manufacturing method disclosed herein can also be rendered suitable for a manufacturing method for multi-wall CNTs utilizing CNT hybrid structures having the latter type of assembled fullerenes. Samples of assembled fullerenes containing fullerenes other than $C_{60}$ are assembled fullerenes formed from $C_{60}$ and $C_{70}$ fullerenes, and assembled fullerenes formed chiefly from fullerenes other than $C_{60}$ (for example, $C_{70}$), etc. Further, either a part or the entirety of the fullerenes that form the assembled fullerenes may be fullerenes whose interiors (inside the shell thereof) contain materials other than carbon (metal molecules, etc.).

Moreover, although CNTs having both ends closed can also be considered a type of fullerene, 'fullerene' in the present specification refers to spherical or approximately spherical fullerenes. Fullerenes of $C_{100}$ or below are preferred.

Usually, the majority (typically, almost the entirety) of fullerenes within one CNT tend to be linked in one unit, forming one chain of assembled fullerenes. Moreover, the fullerenes within one CNT may also be linked in two or more separate units (forming two or more chains of assembled fullerenes). Alternatively, the assembled fullerenes within the CNT may also be fullerenes housed in a separated manner (independently). In the case where two or more chains of assembled fullerenes are housed within one CNT, the assembled fullerenes may be housed along the axial direction of the CNT (in series), or along the radial direction thereof (in parallel).

CNT hybrid structures having this type of structure can be manufactured in, for example, the following manner.

First, the single-wall CNTs, the tubes thereof being empty, are prepared. No particular restriction are placed on the single-wall CNTs utilized, which can be obtained by prior methods, such as the arc discharge method, pulsed laser evaporation method, thermal decomposition method, etc.

An end (anterior end) of each single-wall CNT is opened. For example, the single-wall CNTs are heated in an oxidizing atmosphere (combustion treatment) and an oxidizing acid such as nitric acid or the like is caused to act thereupon (oxidation treatment), this allowing an end of the single-wall CNTs to be opened as desired.

The single-wall CNTs, having one end open, are brought together under prescribed conditions with the fullerenes. By this means, the fullerenes can be inserted (filled) into the tubes of the single-wall CNTs. For example, the single-wall CNTs having one end open can be brought together with the fullerenes at a temperature of approximately 350~600° C. (preferably approximately 400~500° C.) for one hour or longer (typically, approximately 1~48 hours). The fullerenes housed within the tubes usually form linked assembled fullerenes. In this manner, the CNT hybrid structures are manufactured. Alternatively, single-wall CNTs, which have had damage caused to the end and/or wall faces thereof by means of electron beam irradiation or the like can be brought together with the fullerenes to obtain the CNT hybrid structures.

The single-wall CNTs (exterior tubes) that will form the CNT hybrid structures preferably have a diameter in the range of approximately 0.8~2 nm. Manufacture and availability of this size single-wall CNTs is straightforward. Single-wall CNTs with a diameter in the range of approximately 1~1.8 nm are particularly preferred. In this case, the fullerenes (particularly $C_{60}$) can easily be filled into the single-wall CNTs, and the manufacture of the CNT hybrid structures is consequently simple. Further, as will be described below, it is easy to form interior tubes having few defects by means of the electron beam irradiation process. Moreover, the 'diameter' of the CNTs here refers to values taken at the center of the thickness of the wall faces of the CNTs. The diameter can be measured using, for example, a transmission electron microscope (TEM).

In the manufacturing method disclosed herein, electron beam irradiation is performed on the CNT hybrid structures that are in a heated state. Here, a 'heated state' refers to a state whereby the CNT hybrid structures are at a temperature at least higher than room temperature (typically, 25~30° C.). Performing the electron beam irradiation in the 'heated state' allows a faster recovery from the damage (defects) caused by the electron beams than in the case where the electron beam irradiation is performed at room temperature. By this means, the damage to the exterior tubes caused by the electron beams can be controlled (repaired) while the reaction forming the interior tubes from the assembled fullerenes is accelerated, allowing multi-wall CNTs with few defects to be manufactured efficiently. Simultaneously supplying energy as thermal energy and the energy of electron beams distinctly accelerates the formation of the interior tubes from the assembled fullerenes compared to the case where the CNT hybrid structures are only maintained in a heated state (without undergoing electron beam irradiation). As a result, compared to the case where either thermal energy alone or electron beams alone are supplied, multi-wall CNTs with few defects can be manufactured at lower temperatures and/or in a shorter time.

The temperature (degree of heating) when electron beam irradiation is performed is a temperature exceeding regular temperatures, capable of being for example in the range of approximately 60~1000° C., but preferably approximately 80~700° C., and even more preferably approximately 100~500° C. If the temperature when electron beam irradiation is performed exceeds the above temperatures too greatly (for example, exceeding 1000° C.), the high temperature is far more likely to cause carbon to be diffused than to repair the damage caused by the electron beam irradiation. As a result, the efficiency of manufacturing multi-wall CNTs tends to be lower than in the case where electron beam irradiation was performed at the above-mentioned temperatures. Furthermore, it is undesirable from the energy efficiency perspective if the temperature is excessively high when electron beam irradiation is performed. On the other hand, if the temperature during electron beam irradiation is too far below the temperatures described above, the rate of formation of the interior tubes may be low, and may have little effect in repairing the damage (defects) caused by the electron beam irradiation.

The accelerating voltage of the electron beams for irradiating the CNT hybrid structures may be, for example, approximately 80 kV or above (typically, approximately 80~250 kV), and it is preferred that the accelerating voltage is approximately. 100 kV or above (typically, approximately 100~225 kV). An accelerating voltage in the range of approximately 100~200 kV is particularly preferred. If the accelerating voltage is too low, it may have little effect in causing the assembled fullerenes to form into interior tubes. On the other hand, if the accelerating voltage is too high, the repair of the damage caused by irradiation when in a heated state may be exceeded by the damage caused by the electron beam irradiation.

The electron beam radiation dose to the CNT hybrid structures may be in the range of, for example, approximately 10~2000 $C/cm^2/min$, a preferred range is approximately 50~1000 $C/cm^2/min$, and a range of approximately 100~500 $C/cm^2/min$ is particularly preferred. With this radiation dose, electron beam irradiation may be performed for, for example, 5 seconds ~2 hours. A preferred irradiation time is in the range of 15 seconds~1 hour, and a range of 30 seconds~30 minutes is particularly preferred.

A device for irradiating the CNT hybrid structures with electron beams may be, for example, a JEM-2010 made by JAPAN ELECTRON OPTICS LABORATORY CO., LTD. (JEOL), or the like.

A radiation dose D usually obtained from an electron beam irradiating device is shown in the following formula (1).

$$D=K\times I/V \qquad (1)$$

Here, D is radiation dose (kGy), I is total electric current (A), V is processing speed (m/min), and K is a constant on which the device depends. Utilizing this formula (1) etc., the irradiating conditions of the electron beams can be converted so as to be suitable for use in differing devices.

In the manufacturing method taught herein, the thermal energy and the electron beam energy are supplied in a well-balanced manner, thereby multiplying the effect of the energy, this remarkably improving the efficiency of manufacturing the CNT hybrid structures and improving the quality thereof (scarcity of defects, uniformity of shape, etc.). An example of a preferred combination of energy supply conditions is for the electron beam irradiation temperatures to be in the range of approximately 80~700° C. (even more preferred is approximately 200~500° C.) and the accelerating voltage of the electron beams to be in the range of approximately 80~250 kV (even more preferred is approximately 100~200 kV). By combining these temperature and irradiation conditions, and by performing electron beam irradiation for 1 hour or less (preferred conditions are approximately 30 minutes or less, and even more preferred is approximately 15 minutes or less, typically approximately 3~10 minutes), multi-wall CNTs with few defects can be formed. That is, multi-wall CNTs with few defects can be manufactured at markedly lower temperatures and in markedly shorter times than in the conventional thermal processing method utilizing temperatures exceeding 1000° C. and lasting 12 hours or longer (for example, 24 hours at 1100° C.).

The CNT hybrid structures are in a heated state (for example, in a state whereby they have been heated to the preferred temperature range described above) at least while being irradiated with the electron beams. It is preferred that the CNT hybrid structures are maintained in the heated state from before the electron beam irradiation begins (typically at the same temperature as during the electron beam irradiation). For example, from 1 minute or more before electron beam irradiation begins, the CNT hybrid structures can be maintained (heated in preparation) for a specified period at the temperature determined for the electron beam irradiation. The maintained period (period of preparatory heating) can be, for example, 5 minutes or longer (typically 5 minutes~6 hours), and is preferably 10 minutes or longer (typically 10 minutes~3 hours). By performed this type of preparatory heating, it is possible to stably and efficiently manufacture multi-wall CNTs (to form interior tubes) with few defects. Further, it is preferred that after the electron beam irradiation has ended, the resulting products of the irradiation (the multi-wall CNTs) are maintained for a specified period at the same range of temperature utilized during the electron beam irradiation (post-heating). The maintained period (period of post-heating) can be, for example, 5 minutes or longer (typically 5 minutes 6 hours), and is preferably 10 minutes or longer (typically 10 minutes~3 hours). By performing this type of post-heating, it is possible to obtain multi-wall CNTs with even fewer defects.

In the preferred embodiment, the process of introducing the fullerenes into the tubes and forming the CNT hybrid structures, and the process of irradiating the CNT hybrid structures and forming interior tubes can be performed under the same temperature conditions. For example, the single-wall CNTs, having one end open, can be brought together with the fullerenes (typically fullerenes composed chiefly of $C_{60}$) at a temperature of 350~600° C., thereby forming the CNT hybrid structures. Then the CNT hybrid structures that have been obtained can be maintained without interruption at the same temperature (350~600° C.) while electron beam irradiation is performed thereupon, and the interior tubes can be formed from the assembled fullerenes that form part of the CNT hybrid structures. According to this aspect, the time or effort for adjusting the temperature between the process for forming the CNT hybrid structures and the process for forming the interior tubes within the CNT hybrid structures can be eliminated or reduced. Consequently, the manufacture of the multi-wall CNTs is efficient.

The present invention is most suited for a method for manufacturing double-wall CNTs wherein the tubes of single-wall CNTs (exterior tubes) house (have located therein) interior tubes formed chiefly from single-wall graphite. In this type of double-wall CNT, one single-wall CNT (exterior tube) may house one, or two or more interior tubes. In the case where two or more interior tubes are housed within one exterior tube (within the tube), the interior tubes are typically arranged in series within the exterior tube. Alternatively, a portion or the entirety of the interior tubes may be arranged in parallel. Multi-wall CNTs having interior tubes located therein may have the interior tubes extending along approximately the entirety of the exterior tube, or along a portion thereof (at one location or at two or more locations). Multi-wall CNTs not having interior tubes located therein may have fullerenes (formed into assembled fullerenes or independent fullerenes) filled therein, may have materials other than carbon molecules (metal molecules, etc.) filled therein, or may be unfilled.

Either first ends or second ends of the interior tubes forming part of the multi-wall CNTs may be closed or open. In the manufacturing method of the present invention, interior tubes having both ends closed are generally formed first from the assembled fullerenes. Then, one end or both ends of the interior tubes can be opened by means such as concentrating the irradiation of the electron beams on end portions of the interior tubes. The electron beam irradiation for opening the ends of the interior tubes can be performed at room temperature, and can also be performed in a heated state. Alternatively, the ends of the interior tubes can be opened by performing the same method of oxidation treatment, or the like, that is utilized for opening the anterior end of the CNTs.

If the manufacturing method of the present invention is applied after one end or both ends of the interior tubes (first interior tubes) formed from the assembled fullerenes have been opened, fullerenes can be filled into the interior of the first interior tubes and assembled fullerenes (within-interior tube assembled fullerenes) can be formed. Then, while the multi-wall CNTs having these within-interior tube assembled fullerenes are in a heated state, electron beam irradiation is performed thereon, thereby allowing second interior tubes to be formed from the within-interior tube assembled fullerenes within the first interior tubes. According to this method, nested multi-wall CNTs having exterior tubes, first interior tubes and second interior tubes (having a triple layer of walls) can be manufactured.

In the method taught herein, the interior tubes are formed from the assembled fullerenes by irradiating the CNT hybrid structures with electron beams while these CNT hybrid structures are in a heated state. Here, it is easier to restrict the range to which electron beam energy is supplied (irradiation range) than to restrict the thermal energy. This fact can be utilized at a selected location upon the assembled fullerenes housed within the CNT hybrid structures, allowing the interior tubes to be formed at a selected location. The location can be selected by adjusting the irradiation area of the electron beams. For example, the irradiation area of the electron beams can be concentrated within a region having a diameter of 20 nm or less to accelerate the formation (to create multi-walls) of the interior tubes. By further reducing the irradiation area of the electron beams, the region for forming interior tubes can have a diameter of 10 nm or less (typically having a diameter of 2~6 nm). In the case where the interior tubes are formed in this type of selected location, it is particularly preferred that the heat that the CNT hybrid structures require for the electron beam irradiation is maintained in advance, and then will the electron beam irradiation be started.

Furthermore, in the prior art wherein the interior tubes are formed by supplying the CNT hybrid structures with thermal energy (and electron beam irradiation is not performed), it is not possible to form the interior tubes from the assembled fullerenes at a selected location.

In the manufacturing method taught herein, the CNT hybrid structures utilized are, for example, CNT hybrid structures housing assembled fullerenes composed chiefly of $C_{60}$ within the tubes of single-wall CNTs having a diameter of approximately 1.2~1.7 nm, and these CNT hybrid structures, while in a heated state, are irradiated by electron beams. This allows the manufacture of double-wall CNTs wherein, for example, the single-wall CNTs (exterior tubes), that have a diameter of approximately 1.2~1.7 nm, have interior tubes housed therein that have a diameter of approximately 0.3~0.7=m. The preferred conditions for the CNT hybrid structures to undergo electron beam irradiation is for the CNT hybrid structures to be in a state whereby they have been heated to approximately 80~700° C. (more preferred is approximately 100~500° C.), whereby the accelerating voltage of the electron beams is 80~250 kV (more preferred is approximately 100~200 kV), and irradiation is performed for approximately 3~15 minutes. At this point, the preferred electron beam radiation dose is in the range of approximately 100~500 C/cm$^2$/min. Furthermore, at this point the preferred electron beam density is in the range of approximately 1~8×10$^{-11}$ A/cm$^2$ (more preferred is approximately 3~5×10$^{11}$ A/cm$^2$).

According to the present invention, double-wall CNTs can be presented wherein single-wall CNTs that form the exterior tubes (typically single-wall CNTs having a diameter of approximately 1.2~1.7 nm) have interior tubes having a diameter of approximately 0.4 mm or less (having a diameter of approximately 0.3~0.4 nm) housed therein. This type of double-wall CNTs provided with small diameter interior tubes can most suitably be formed by means of the manufacturing method of the present invention described above, wherein the CNT hybrid structures are in a state whereby they have been heated to approximately 350 ~500° C. (more preferred is approximately 400~500° C.) and undergo irradiation by electron beams having an accelerating voltage of approximately 80~150 kV (more preferred is approximately 100~130 kV). At this point, the preferred electron beam irradiation period is approximately 3~10 minutes.

Further, according to the present invention, multi-wall CNTs (typically double-wall CNTs) can be presented wherein the single-wall CNTs that form the exterior tubes (typically single-wall CNTs having a diameter of approximately 1.2~1.7 nm) have a plurality of relatively short interior tubes housed therein in series (that is, aligned along a longitudinal direction of the exterior tubes). It is possible to obtain interior tubes having an average length of approximately 1~5 nm (typically approximately 1~3.5 nm).

For example, in one of the preferred conditions, multi-wall CNTs can be presented wherein the average length of the interior tubes is approximately 3~3.5 nm. This length corresponds to each interior tube being formed from approximately 3~5 $C_{60}$. At this point, it is preferred that the length of each interior tube is in the range of approximately 2.9~4 nm.

In another of the preferred conditions, multi-wall CNTs can be presented wherein the average length of the interior tubes is approximately 1.8~2.2 nm. This length corresponds to each interior tube being formed from approximately 2~3 $C_{60}$. At this point, it is preferred that the length of each interior tube is in the range of approximately 1.4~2.5 nm.

In yet another of the preferred conditions, multi-wall CNTs can be presented wherein the average length of the interior tubes is approximately 1~1.4 nm. This length corresponds to each interior tube being formed from approximately 1~2 $C_{60}$. At this point, it is preferred that the length of each interior tube is in the range of approximately 0.5~1.5 nm.

These double-wall CNTs provided with a plurality of relatively short interior tubes housed therein in series can most suitably be formed by means of the manufacturing method of the present invention described above, wherein the CNT hybrid structures are in a state whereby they have been heated to approximately 70~250° C. (more preferred is approximately 100~200° C.) and undergo irradiation by the electron beams that have an accelerating voltage of approximately 80~150 kV (more preferred is approximately 100~130 kV). At this point, the preferred electron beam density is in the range of approximately 0.5~5×10$^{-11}$ A/cm$^2$ (more preferred is approximately 1~3×10$^{-11}$ A/cm$^2$). The average length of the interior tubes can be controlled by the electron beam irradiation period, etc. The tendency is that, other conditions being approximately equal, the longer the irradiation period, the greater the average length of the interior tubes that are formed (the number of $C_{60}$ molecules utilized for forming each interior tube increases).

EXAMPLES

<Test 1; Manufacture of the CNT Hybrid Structures>

Oxidation treatment was performed on single-wall CNTs having an average diameter of approximately 1.5 nm, thereby opening anterior ends thereof. The single-wall CNTs, the anterior ends thereof being open, were mixed with $C_{60}$ molecules, and were maintained in a vacuum (pressure; 1.0×10$^{-3}$ Pa) at 450° C. for 24 hours. When the resulting products were observed using a transmission electron microscope (TEM) with magnification 500,000, $C_{60}$ molecules had been filled within the single-wall CNTs, as shown in the TEM photograph of FIG. 1(a). These $C_{60}$ molecules had linked to form assembled fullerenes. In this manner, the CNT hybrid structures, these being the assembled fullerenes consisting mainly of $C_{60}$ housed within the CNTs, were manufactured.

In order to make the structure shown in the TEM photograph of FIG. 1(a) easier to identify, FIG. 1(b) shows a portion of the TEM photograph with a white line showing the structure entered thereon. The oval-shaped portion surrounded by the white line in FIG. 1(a) and FIG. 1(b) is the same area.

<Test 2; Thermal Treatment of the CNT Hybrid Structures>

CNT hybrid structures that had been manufactured in the manner of Test 1 were maintained in a vacuum at the pressure described above at 400° C. for 1 hour. This thermal treatment was observed using the TEM under the same conditions as described above. The result, as shown in the TEM photograph of FIG. 2(a), was that the formation of interior tubes from the assembled fullerenes could not be seen. That is, with treatment of 400° C.×1 hour (not accompanied by electron beam irradiation), multi-wall CNTs could not be obtained.

Figure 2:
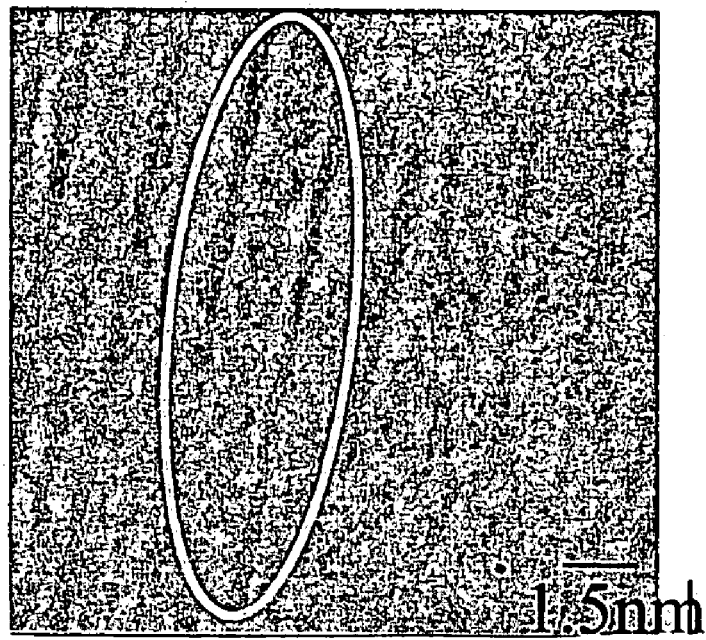
FIG. 2(a) is a TEM photograph of the result obtained from treating the CNT hybrid structure by the method of Test 2 (magnification; 500,000)
FIG. 2(b) is a view describing the structure shown in the TEM photograph.
Figure 2:
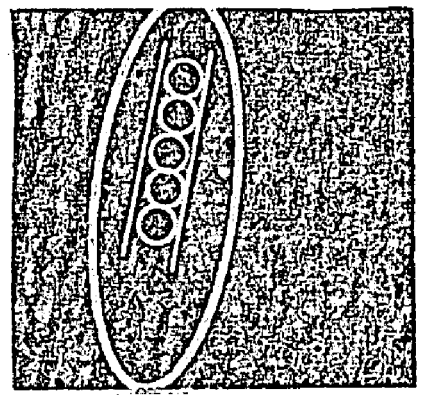

Moreover, like FIG. 1(b), FIG. 2(b) shows a TEM photograph shown in FIG. 2(a), a white line being entered thereon to show the structure depicted in the TEM photograph.

<Test 3; Thermal Treatment of the CNT Hybrid Structures>

CNT hybrid structures that had been manufactured in the manner of Test 1 were subjected to thermal treatment under the same conditions as in Test 2, differing therefrom in that the temperature was 450° C., and were observed using the TEM in the same manner. The results, as shown in the TEM photograph of FIG. 3(a), was that the formation of interior tubes from the assembled fullerenes could not be seen. That is, with treatment of 450° C.×1 hour (not accompanied by electron beam irradiation), multi-wall CNTs could not be obtained.

Figure 3:
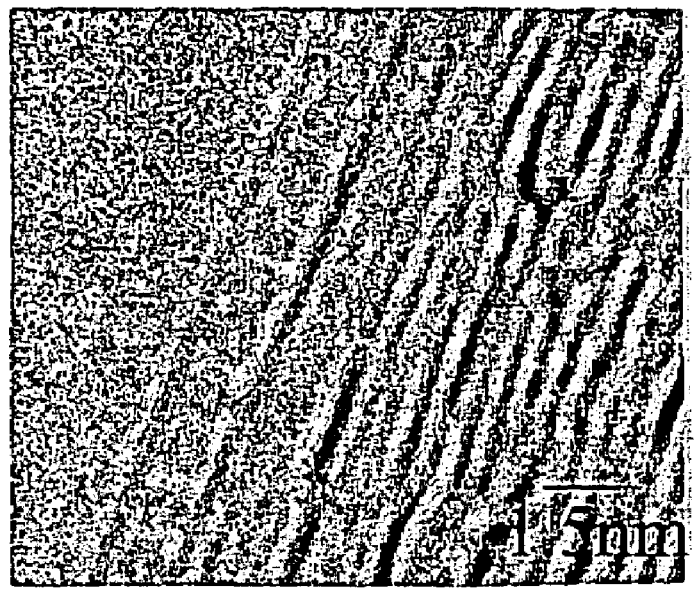
FIG. 3(a) is a TEM photograph of the result obtained from treating the CNT hybrid structure by the method of Test 3 (magnification; 500,000)
FIG. 3(b) is a view describing the structure shown in the TEM photograph.
Figure 3:
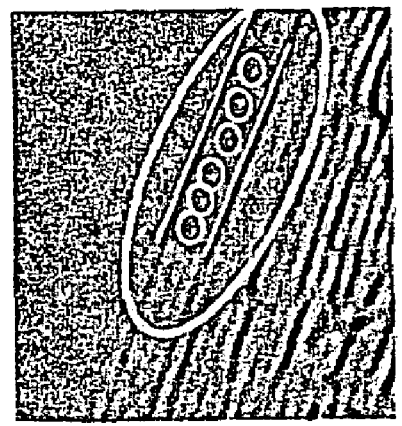

Moreover, like FIG. 1(b), FIG. 3(b) shows a TEM photograph shown in FIG. 3(a), a white line being entered thereon to show the structure depicted in the TEM photograph.

Test 4; Thermal and Electron Beam Irradiation Treatment of the CNT Hybrid Structures>

CNT hybrid structures that had been manufactured in the manner of Test 1 were maintained in a vacuum at the pressure described above (1.0×10$^{-3}$ Pa) at 400° C. for 1 hour (heated in preparation), then were subjected to irradiation under the same conditions (that is, 1.0×10$^{-3}$ Pa, 400° C.) with electron beams having an accelerating voltage of approximately 120 kV for approximately 5 minutes (electron beam radiation dose; approximately 200~250 C/cm$^2$/min). The irradiation area of the electron beams was a circular shape having a diameter of approximately 20 nm. At this point, the electron beam density could be approximately 3~5×10$^{-11}$ A/cm$^2$. In the present test, it was approximately 4×10$^{-11}$ A/cm$^2$. The results of this thermal and electron beam irradiation treatment were observed using the TEM under the same conditions as described above. The result, as shown in the TEM photograph of FIG. 4(a), was that the formation of double-wall CNTs, wherein interior tubes were housed within CNTs (exterior tubes), could be identified. The diameter of the exterior tubes of the double-wall CNTs was approximately 1.3 nm, and the diameter of the interior tubes was approximately 0.41 nm. Further, as can be identified from FIG. 4(a), conspicuous defects (obvious irregularities, etc.) in the exterior tubes and the interior tubes of the double-wall CNTs were not seen. That is, according to the present test, electron beam irradiation treatment (accelerating voltage; 120 kV) at 400° C. for approximately 5 minutes allowed double-wall CNTs with few defects to be obtained.

Figure 4:
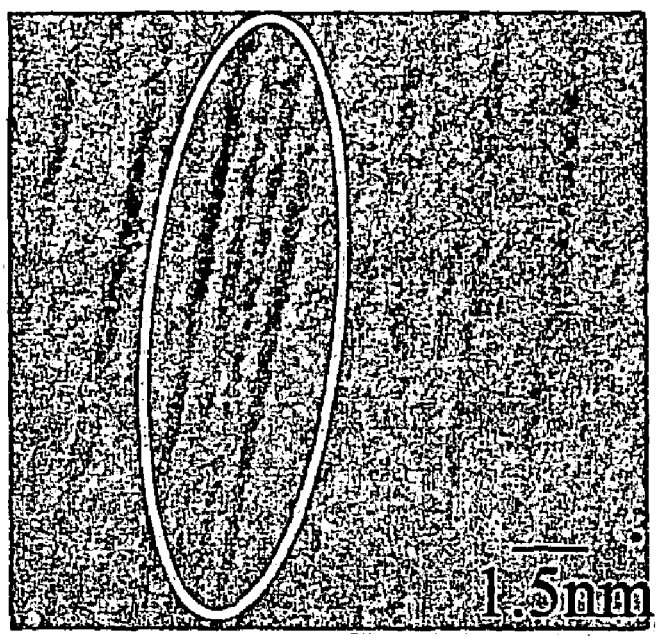
FIG. 4(a) is a TEM photograph of the multi-wall CNT obtained by the method of Test 4 (magnification; 500,000)
FIG. 4(b) is a view describing the structure shown in the TEM photograph.
Figure 4:
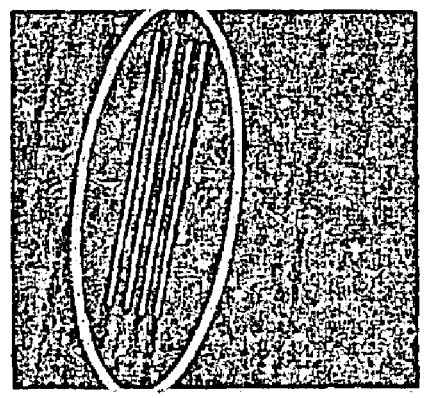

Moreover, like FIG. 1(b), FIG. 4(b) shows a TEM photograph shown in FIG. 4(a), a white line being entered thereon to show the structure depicted in the TEM photograph. Furthermore, in the present test, and in Tests 5~12 and 14~16, the device for irradiating with electron beams was a JEM-2010 made by JEOL.

<Test 5; Thermal and Electron Beam Irradiation Treatment of the CNT Hybrid Structures>

CNT hybrid structures that had been manufactured in the manner of Test 1 were maintained in a vacuum at the pressure described above at 450° C. for 1 hour (heated in preparation) then, under the same conditions and as in Test 4, were subjected to irradiation by electron beams having an accelerating voltage of approximately 120 kV for approximately 5 minutes. The results of this thermal and electron beam irradiation treatment were observed using the TEM under the same conditions as described above. The result, as shown in the TEM photograph of FIG. 5(a), was that the formation of double-wall CNTs, wherein interior tubes were housed within CNTs (exterior tubes), could be identified. The diameter of the exterior tubes of the double-wall CNTs was approximately 1.49 nm, and the diameter of the interior tubes was approximately 0.39 nm. Further, as can be identified from FIG. 5(a), conspicuous defects in the exterior tubes and the interior tubes of the double-wall CNTs were not seen. That is, according to the present test, electron beam irradiation treatment (accelerating voltage; 120 kV) at 450° C. for approximately 5 minutes allowed double-wall CNTs with few defects to be obtained.

Figure 5:
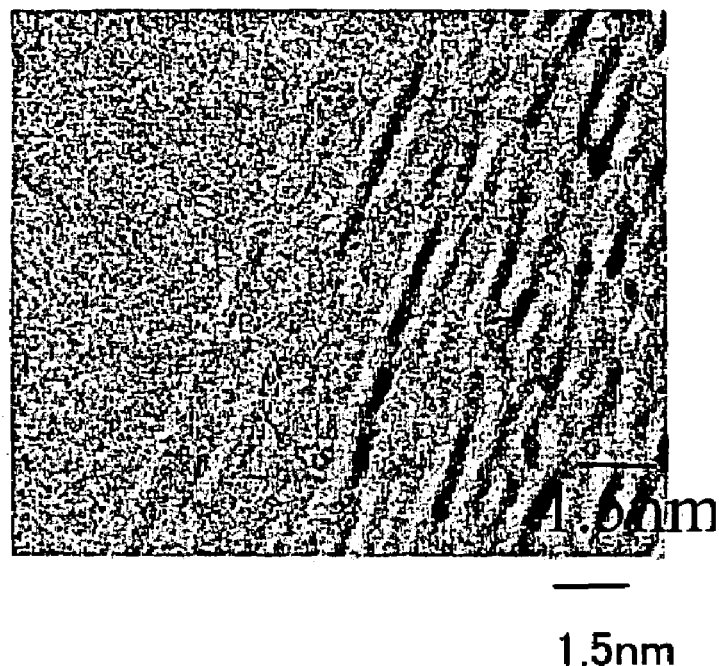
FIG. 5(a) is a TEM photograph of the multi-wall CNT obtained by the method of Test 5 (magnification; 500,000)
FIG. 5(b) is a view describing the structure shown in the TEM photograph.
Figure 5:
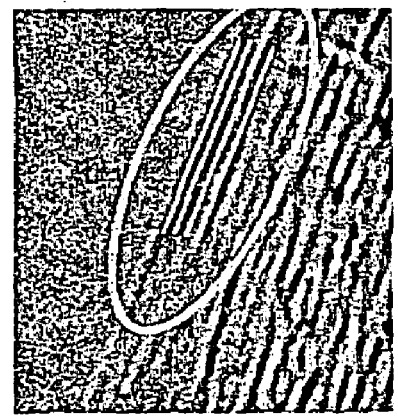

Moreover, like FIG. 1(b), FIG. 5(b) shows a TEM photograph shown in FIG. 5(a), a white line being entered thereon to show the structure depicted in the TEM photograph.

<Test 6; Thermal and Electron Beam Irradiation Treatment of the CNT Hybrid Structures>

CNT hybrid structures that had been manufactured in the manner of Test 1 were maintained in a vacuum at the pressure described above at 200° C. for 1 hour (heated in preparation) then, under the same conditions, were subjected to irradiation by electron beams having an accelerating voltage of approximately 120 kV for approximately 10 minutes. The irradiation area of the electron beams was a circular shape having a diameter of approximately 20 nm. The results of this thermal and electron beam irradiation treatment were observed using the TEM under the same conditions as described above. The result was that the formation of double-wall CNTs having the same structure as shown in FIG. 4(a) could be identified. Conspicuous defects in the exterior tubes and the interior tubes of the double-wall CNTs were not seen. That is, according to the present test, electron beam irradiation treatment (accelerating voltage; 120 kV) at 200° C. for approximately 10 minutes allowed double-wall CNTs with few defects to be obtained.

<Test 7; Thermal and Electron Beam Irradiation Treatment of the CNT Hybrid Structures>

CNT hybrid structures that had been manufactured in the manner of Test 1 were subjected to the same thermal and electron beam irradiation treatment as in Test 4, differing therefrom in that the accelerating voltage of the electron beams was 200 kV, the electron beam radiation dose was in the range of approximately 130~480 C/cm$^2$/min, and the radiation period was 2.5 minutes. The result identified, observed using the TEM, was that electron beam irradiation treatment (accelerating voltage; 200 kV) at 400° C. for 2.5 minutes also allowed the formation of double-wall CNTs having the same structure as shown in FIG. 4(a).

<Test 8; Thermal and Electron Beam Irradiation Treatment of the CNT Hybrid Structures>

CNT hybrid structures that had been manufactured in the manner of Test 1 were subjected to the same thermal and electron beam irradiation treatment as in Test 4, differing therefrom in that the temperature during the electron beam irradiation treatment was 200° C., the accelerating voltage of the electron beams was 200 kV, and the electron beam radiation dose was in the range of approximately 130~200 C/cm 2/min. The result identified, observed using the TEM, was that the electron beam irradiation treatment (accelerating voltage; 200 kV) at 200° C. for approximately 5 minutes also allowed the formation of double-wall CNTs having the same structure as shown in FIG. 4(a).

<Test 9; Room Temperature and Electron Beam Irradiation Treatment of the CNT hybrid structures>

CNT hybrid structures that had been manufactured in the manner of Test 1 were maintained in a vacuum at the pressure described above and, while at room temperature (approximately 25° C.) were subjected to irradiation by electron beams having an accelerating voltage of approximately 120 kV for approximately 5 minutes (electron beam radiation dose; approximately 200~250 C/cm$^2$/min). The irradiation area of the electron beams was a circular shape having a diameter of approximately 20 nm. When the results of the room temperature and electron beam irradiation treatment were observed using the TEM under the same conditions as described above, it was discovered that a portion of the $C_{60}$ housed within the CNTs (exterior tubes) had fused together, as shown in the TEM photograph of FIG. 6(a). However, judging from the marked irregularities of the wall faces, many defects were present in this fused matter. Further, marked irregularities were also present on the wall faces of the exterior tubes, a large degree of damage caused by the electron beam irradiation being identified.

Figure 6:
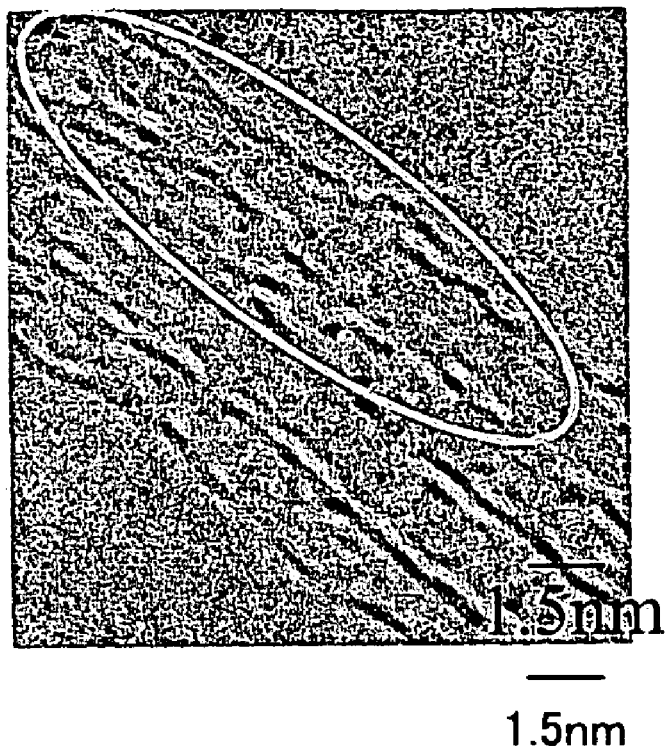
FIG. 6(a) is a TEM photograph of the result obtained from treating the CNT hybrid structure by the method of Test 9 (magnification; 500,000)
FIG. 6(b) is a view describing the structure shown in the TEM photograph.
Figure 6:
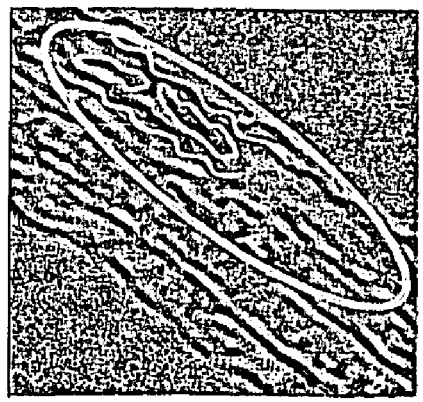

Moreover, like FIG. 1(b), FIG. 6(b) shows a TEM photograph shown in FIG. 6(a), a white line being entered thereon to show the structure depicted in the TEM photograph.

Test conditions and the absence or presence of interior tube formation for Tests 2~9 are shown in Table 1. As shown in Table 1, Tests 4~8, in which irradiation with electron beams having an accelerating voltage of approximately 120~200 kV at temperatures of approximately 200~450° C. for approximately 2.5~10 minutes, were all capable of forming double-wall CNTs with few defects.

TABLE 1

|  | Accelerating voltage (kV) | Irradiation period (min) | Temperature (° C.) | Heating period (hr) | Presence/ Absence of interior tube formation |
|---|---|---|---|---|---|
| Test 2 | — | — | 400 | 1 | X |
| Test 3 | — | — | 450 | 1 | X |
| Test 4 | 120 | 5 | 400 | 1 | O |
| Test 5 | 120 | 5 | 450 | 1 | O |
| Test 6 | 120 | 10 | 200 | 1 | O |
| Test 7 | 200 | 2.5 | 400 | 1 | O |
| Test 8 | 200 | 5 | 200 | 1 | O |
| Test 9 | 120 | 5 | r.t. | — | X (many defects) |

Range of Electron beam radiation dose: 130~480 C./cm$^2$/min

<Test 10; Thermal and Electron Beam Irradiation Treatment of the CNT Hybrid Structures>

CNT hybrid structures that had been manufactured in the manner of Test 1 were subjected to the same thermal and electron beam irradiation treatment as in Test 4, differing therefrom in that the temperature during the electron beam irradiation treatment was 200° C., and the irradiation period was approximately 12 minutes. The result identified from this thermal and electron beam treatment, observed using the TEM under the same conditions as described above, was the formation of double-wall CNTs having exterior tubes with a diameter of approximately 1.5 nm, and interior tubes with a diameter of approximately 0.48 nm. Conspicuous defects in the exterior tubes and the interior tubes were not seen.

<Test 11; Thermal and Electron Beam Irradiation Treatment of the CNT Hybrid Structures>

CNT hybrid structures that had been manufactured in the manner of Test 1 were subjected to the same thermal and electron beam irradiation treatment as in Test 4, differing therefrom in that the accelerating voltage of the electron beams was 200 kV, the temperature during the electron beam irradiation treatment was 200° C., and the irradiation period was approximately 7 minutes. The result identified from this thermal and electron beam treatment, observed using the TEM under the same conditions as described above, was the formation of double-wall CNTs having exterior tubes with a diameter of approximately 1.5 nm, and interior tubes with a diameter of approximately 0.52 nm. Conspicuous defects in the exterior tubes and the interior tubes were not seen.

<Test 12; Thermal and Electron Beam Irradiation Treatment of the CNT Hybrid Structures>

CNT hybrid structures that had been manufactured in the manner of Test 1 were subjected to the same thermal and electron beam irradiation treatment as in Test 4, differing therefrom in that the accelerating voltage of the electron beams was 200 kV, and the irradiation period was approximately 3 minutes. The result identified from this thermal and electron beam treatment, observed using the TEM under the same conditions as described above, was the formation of double-wall CNTs having exterior tubes with a diameter of approximately 1.5 nm, and interior tubes with a diameter of approximately 0.54 run. Conspicuous defects in the exterior tubes and the interior tubes were not seen.

<Test 13; Thermal Treatment of the CNT Hybrid Structures>

CNT hybrid structures that had been manufactured in the manner of Test 1 were maintained in a vacuum at the pressure described above at 1200° C. for 12 hours. The results of this thermal treatment were observed using the TEM under the same conditions as described above. The result identified was the formation of double-wall CNTs having exterior tubes with a diameter of approximately 1.5 nm, and interior tubes with a diameter of approximately 0.60 nm.

Test conditions and the diameter of the interior and exterior tubes for Tests 10~13 and Tests 4 and 5 are brought together in Table 2. As shown in Table 2, the double-wall CNTs of Tests 4 and 5, obtained via irradiation with electron beams having an accelerating voltage of approximately 100~130 kV (here, 120 kV) at temperatures of approximately 400~450° C. for approximately 3~10 minutes (here, 5 minutes) have interior tubes with a diameter of approximately 0.4 nm or less, this being notably smaller than in the double-wall CNTs of Test 13 obtained via thermal treatment at a temperature over 1000° C. (here, 1200° C.) over a long period (here, 12 hours). Since an electric charge readily concentrates in this type of small diameter CNT, it can be utilized as an electron emission source.

TABLE 2

|  | Accelerating voltage (kV) | Irradiation period (min) | Temperature (° C.) | Heating period (hr) | Interior tube diameter (nm) | Exterior tube diameter (nm) |
|---|---|---|---|---|---|---|
| Test 10 | 120 | 12 | 200 | 1 | 0.48 | 1.5 |
| Test 4 | 120 | 5 | 400 | 1 | 0.41 | 1.3 |
| Test 5 | 120 | 5 | 450 | 1 | 0.39 | 1.5 |
| Test 11 | 200 | 7 | 200 | 1 | 0.52 | 1.5 |
| Test 12 | 200 | 3 | 400 | 1 | 0.54 | 1.5 |
| Test 13 | — | — | 1200 | 12 | 0.60 | 1.5 |

Range of Electron beam radiation dose: 130~480 C./cm$^2$/min

<Test 14; Thermal and Electron Beam Irradiation Treatment of the CNT Hybrid Structures>

CNT hybrid structures that had been manufactured in the manner of Test 1 were maintained in a vacuum at the pressure described above at 190° C. for 1 hour (heated in preparation) then, under the same conditions (temperature and vacuum), were subjected to irradiation with electron beams having an accelerating voltage of approximately 120 kV for approximately 2 minutes. The irradiation area of the electron beams was a circular shape having a diameter of approximately 200 nm. At this point, the electron beam density was approximately 1~3×10$^{-11}$ A/cm$^2$ (here, approximately 2×10$^{-11}$ A/cm$^2$). When the results of the thermal and electron beam irradiation treatment were observed using the TEM under the same conditions as described above, double-wall CNTs had been formed wherein a plurality of interior tubes were housed in series within the exterior tubes. The length of each interior tube was in the range of approximately 1~1.4 nm, the average length being approximately 1.3 nm. The length of these interior tubes corresponds approximately to each interior tube being formed from 1~2 adjacent C$_{60}$ of the assembled fullerenes that form part of the CNT hybrid structures.

<Test 15; Thermal and Electron Beam Irradiation Treatment of the CNT Hybrid Structures>

The same thermal and electron beam irradiation treatment as in Test 14 was performed, differing therefrom in that the irradiation period with the electron beams was approximately 5 minutes. When the results of the thermal and electron beam irradiation treatment were observed using the TEM under the same conditions as described above, double-wall CNTs had been formed wherein a plurality of interior tubes were housed in series within the exterior tubes. The length of each interior tube was in the range of approximately 1.8~2.2 nm, the average length being approximately 2.1 nm. The length of these interior tubes corresponds approximately to each interior tube being formed from 2~3 adjacent $C_{60}$ of the assembled fullerenes that form part of the CNT hybrid structures.

<Example 16; Thermal and Electron Beam Irradiation Treatment of the CNT Hybrid Structures>

The same thermal and electron beam irradiation treatment as in Test 14 was performed, differing therefrom in that the irradiation period with the electron beams was approximately 12 minutes. When the results of the thermal and electron beam irradiation treatment were observed using the TEM under the same conditions as described above, double-wall CNTs had been formed wherein a plurality of interior tubes were housed in series within the exterior tubes. The length of each interior tube was in the range of approximately 2.9~4 nm, the average length being approximately 3.4 nm. The length of these interior tubes corresponds approximately to each interior tube being formed from 3~5 adjacent $C_{60}$ of the assembled fullerenes that form part of the CNT hybrid structures.

Test conditions and the average length of the interior tubes for Tests 14-16 are brought together in Table 3. As shown in Table 3, the average length of the interior tubes to be formed can be controlled by adjusting the irradiation period with the electron beams.

TABLE 3

| | Accelerating voltage (kV) | Irradiation period (min) | Temperature (° C.) | Interior tube length (nm) |
|---|---|---|---|---|
| Test 14 | 120 | 2 | 190 | 1.3 |
| Test 15 | 120 | 5 | 190 | 2.1 |
| Test 16 | 120 | 12 | 190 | 3.4 |

Range of Electron beam radiation dose: 190 C/cm$^2$/min

The embodiment described above merely illustrates some possibilities of the invention and does not restrict the claims thereof. The art set forth in the claims encompasses various transformations and modifications to the embodiment described above.

Furthermore, the technical elements disclosed in the present specification or figures may be utilized separately or in all types of conjunctions and are not limited to the conjunctions set forth in the claims at the time of submission of the application. Furthermore, the art disclosed in the present specification or figures may be utilized to simultaneously realize a plurality of aims or to realize one of these aims.

What is claimed is:

1. A method for manufacturing multi-wall carbon nanotubes comprising:
   a process for preparing fullerene/carbon nanotube hybrid structures wherein assembled fullerenes, these being fullerenes that are linked, are housed within carbon nanotubes, and
   a process whereby the hybrid structures are subjected to electron beam irradiation while in a heated state, thereby forming interior tubes from the assembled fullerenes;
   wherein the hybrid structures are subjected to irradiation with the electron beams while in a state of being heated to 80-700°C.

2. A method as set forth in claim 1, wherein the assembled fullerenes are essentially composed of $C_{60}$ fullerenes.

3. A method as set forth in claim 1, wherein the carbon nanotubes forming part of the hybrid structures are essentially single-wall carbon nanotubes.

4. A method as set forth in claim 1, wherein the hybrid structures are subjected to irradiation with the electron beams while in a state of being heated to 100~500°C.

5. A method as set forth in claim 1, wherein the hybrid structures are subjected to irradiation with the electron beams having an accelerating voltage of 80~250 kV.

6. A method as set forth in claim 1, wherein the hybrid structures are subjected to irradiation with the electron beams at 100~500 C/cm$^2$/min.

7. A method as set forth in claim 1, wherein the hybrid structures are subjected to irradiation with the electron beams at an electron beam density of 1~8×10$^{-11}$ A/cm$^2$.

8. A method as set forth in claim 1, wherein the hybrid structures are subjected to irradiation with the electron beams for 15 minutes or less.

9. A method as set forth in claim 1, wherein the hybrid structures are subjected to irradiation with the electron beams having an accelerating voltage of 80~150 kV.

10. A method as set forth in claim 1, wherein the hybrid structures are subjected to irradiation with the electron beams at an electron beam density of 0.5~5×10$^{-11}$ A/cm$^2$.

11. A method as set forth in claim 1, wherein the hybrid structures are maintained in the heated state for a specified period before irradiation with the electron beams begins.

12. A method as set forth in claim 1, wherein, after the irradiation of the hybrid structures with the electron beams has finished, resulting products thereof are maintained for a specified period within the same temperature range as during irradiation.

13. A method as set forth in claim 1, wherein a process for preparing the hybrid structures includes a treatment whereby the fullerenes and the carbon nanotubes having an opening therein are brought together, and the fullerenes are filled into the carbon nanotubes.

14. The method of claim 1, wherein recovery from damage caused by the irradiation is accelerated by the heated state of the hybrid structures.

15. A method for manufacturing multi-wall carbon nanotubes comprising:
   a process for preparing fullerene/carbon nanotube hybrid structures wherein assembled fullerenes, these being fullerenes that are linked, are housed within carbon nanotubes, and
   a process whereby the hybrid structures are subjected to electron beam irradiation while in a heated state, thereby forming interior tubes from the assembled fullerenes;
   wherein the hybrid structures are subjected to irradiation with the electron beams while in a state of being heated to 7-250°C.

* * * * *